United States Patent
Shajarati (10) Patent No.: US 9,742,338 B2
(45) Date of Patent: Aug. 22, 2017

(54) DUAL POWER MODE DRIVE

(71) Applicant: Danfoss Power Electronics A/S, Graasten (DK)

(72) Inventor: Omid Shajarati, Egernsund (DK)

(73) Assignee: Danfoss Power Electronics A/S, Graasten (DK)

(*) Notice: Subject to any disclaimer, the term of this patent is extended or adjusted under 35 U.S.C. 154(b) by 0 days.

(21) Appl. No.: 14/898,797

(22) PCT Filed: May 23, 2014

(86) PCT No.: PCT/IB2014/061645
§ 371 (c)(1),
(2) Date: Dec. 16, 2015

(87) PCT Pub. No.: WO2014/203097
PCT Pub. Date: Dec. 24, 2014

(65) Prior Publication Data
US 2016/0126879 A1  May 5, 2016

(30) Foreign Application Priority Data

Jun. 21, 2013 (DK) .................. 2013 00384

(51) Int. Cl.
*H02K 17/32* (2006.01)
*H02P 27/06* (2006.01)
(Continued)

(52) U.S. Cl.
CPC .............. *H02P 27/06* (2013.01); *H02J 9/062* (2013.01); *H02P 29/025* (2013.01)

(58) Field of Classification Search
CPC ..... H02P 29/025; H02P 27/06; B60L 11/1861
See application file for complete search history.

(56) References Cited

U.S. PATENT DOCUMENTS 4,375,701 A    3/1983  Hanson
4,591,782 A *  5/1986  Germer .............. G01R 21/1338
                                              324/103 R
(Continued)

FOREIGN PATENT DOCUMENTS

CN     2383269 Y     6/2000
CN     103023426 A   4/2013
(Continued)

OTHER PUBLICATIONS

Holtz J. et al., "Unterbrechungsfreier Betrieb Von Drehstromantrieben", from ETZ Elektrotechnische Zeitschrift, vol. 112, No. 6/7, Mar. 1, 1991, pp. 273-277 and corresponding English Translation.
(Continued)

*Primary Examiner* — Karen Masih
(74) *Attorney, Agent, or Firm* — McCormick, Paulding & Huber LLP (57) ABSTRACT

A method of controlling a motor drive having a normal mode wherein a DC link voltage is charged using an AC (e.g. mains) power supply and an emergency mode wherein the DC link voltage is charged using a DC supply (e.g. from a battery) is described. In the normal mode of operation, if the DC link voltage falls below a threshold indicative of the AC power supply being lost, the emergency mode is entered, typically following an intervening coast mode (during which the motor is not driven). Similarly, in the emergency mode, if the DC link voltage rises above a threshold indicative of the AC power supply being restored, the normal mode is entered, typically following an intervening coast mode.

20 Claims, 5 Drawing Sheets

(51) Int. Cl.
*H02P 29/024* (2016.01)
*H02J 9/06* (2006.01)

(56) References Cited

U.S. PATENT DOCUMENTS

| | | | |
|---|---|---|---|
| 4,698,530 | A | 10/1987 | Thomson |
| 2006/0061320 | A1 | 3/2006 | Ma et al. |
| 2012/0098475 | A1 | 4/2012 | Noguchi |
| 2013/0043813 | A1 | 2/2013 | Lucas et al. |

FOREIGN PATENT DOCUMENTS

| | | |
|---|---|---|
| CN | 103166569 A | 6/2013 |
| DE | 4325210 A1 | 2/1994 |
| GB | 2186129 A | 8/1987 |
| JP | 01174229 A | 7/1989 |
| JP | 2013-42619 A | 2/2013 |
| JP | 2013-93988 A | 5/2013 |
| WO | 8901719 A1 | 2/1989 |

OTHER PUBLICATIONS

Trenner A. et al., "Ueberbruekung Von Netzspannungseinbruechen Oder Kurzen Netzausfaellen Bei Asynchronmaschinenantrieben mit Spannungzwischenkreisumrichtern", from Elin Zeitschrift, vol. 42, No. 1/2, Jan. 1, 1990. pp. 27-30 and corresponding English Translation.

Holtz J. et al., "Controlled AC Drives with Ride-Through Capability at Power Interruption", from Conference Record of the Industry Applications Conferences IAS Annual Meeting, Toronto, Oct. 3-6, 1993, vol. Part 01, Oct. 3, 1993, pp. 629-636, XP000427484.

Subhomoy Chattopadhyay et al., "Predicting Behavior of Induction Motors During Electrical Service Faults and Momentary Voltage Interruptions", from Record of the Industrial and Commercial Power Systems Technical Conference, St. Petersburg, May 2-6, 1993, vol. -, May 2, 1993, pp. 78-84, XP000416219.

Communication Pursuant to European Patent Application No. 14 733 340.5-1804 dated Jun. 9, 2017.

* cited by examiner

DUAL POWER MODE DRIVE

CROSS-REFERENCE TO RELATED APPLICATIONS

This application is entitled to the benefit of and incorporates by reference subject matter disclosed in the International Patent Application No. PCT/IB2014/061645 filed on May 23, 2014 and Danish Patent Application No. 201300384 filed on Jun. 21, 2013.

TECHNICAL FIELD

The present invention relates to inverters, in particular to inverters having AC and DC input power modes.

BACKGROUND

Figure 1:
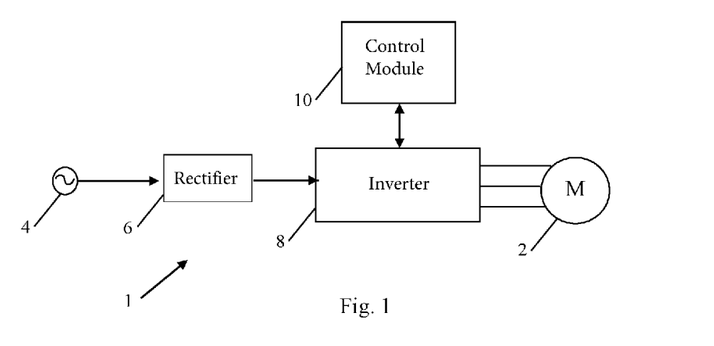
FIG. 1 shows a known inverter drive system.

FIG. 1 shows a simple motor system, indicated generally by the reference numeral 1. The motor system 1 comprises a three-phase motor 2, an AC power source 4, a rectifier 6, an inverter 8 and a control module 10.

The output of the AC power source 4 is connected to the input of the rectifier 6. The output of the rectifier 6 provides DC power to the inverter 8. In a manner well known in the art, the inverter module includes a switching module, typically comprising insulated gate bipolar transistors (IGBTs) that are driven by gate control signals in order to convert the DC voltage into an AC voltage having a frequency and phase dependent on the gate control signals. The gate control signals are provided by the control module 10. In this way, the frequency and phase of each input to the motor 2 can be readily controlled.

The inverter 8 is in two-way communication with the control module 10. The inverter typically monitors currents and voltages in each of the three connections to the motor 2 and provides that current and voltage data to the control module 10 (although the use of both current and voltage sensors is by no means essential). The control module 10 may make use of the current and/or voltage data (where available) when generating the gate control signals required to operate the motor as desired; another arrangement is to estimate the currents from the drawn voltages and the switching pattern—other control arrangement also exist.

The motor 2 may be used in a wide variety of applications. In some applications, it may be important that the motor 2 functions, even if the AC power supply 4 fails. For example, the motor 2 may be used to operate a cooling fan. If the motor 2 fails, then the cooling fan does not operate and, unless other control arrangements are provided, the device being cooled may overheat.

In such circumstances, it is known to provide a backup power supply, in the event that the AC power supply 4 fails. For example, a bank of batteries providing a DC power source may be provided in the event that the AC power source 4 fails.

Although the use of AC and DC power supplies for a motor drive system is known, there remains a need for improved algorithms for controlling such systems. In particular there remains a need for novel algorithms for controlling the entry into an emergency mode of operation in the event that the AC power supply fails and the exiting of the emergency mode of operation in the event that the AC power supply is restored.

The present invention seeks to address at least some of the problems outlined above.

SUMMARY

The present invention provides a method of controlling a motor drive, the method comprising a normal operation mode wherein a DC link voltage is charged using an AC supply (typically a mains power supply) and an emergency mode wherein the DC link voltage is charged using a DC supply (for example provided by a battery), wherein: in the normal mode of operation, determining whether the DC link voltage falls below a first threshold (indicative of the AC power supply being lost) and, if so, entering the emergency mode of operation; and in the emergency mode of operation, determining whether the DC link voltage rises above a second threshold (indicative of the AC power supply being restored) and, if so, entering the normal mode of operation. The method further comprises entering a first coast mode before entering the emergency mode of operation from the normal mode of operation and/or entering a second coast mode before entering the normal mode of operation from the emergency mode of operation.

The present invention also provides a control module configured to determine a DC link voltage of a motor drive, wherein: in a normal mode of operation, the control module determines whether the DC link voltage falls below a first threshold and, if so, enters an emergency mode of operation, wherein in the emergency mode, the DC link voltage is charged using a DC supply; and in the emergency mode of operation, the control module determines whether the DC link voltage rises above a second threshold and, if so, enters the normal mode of operation, wherein in the normal mode the DC link voltage is charged using an AC power supply, wherein the control module is further configured to enter a first coast mode before entering the emergency mode of operation from the normal mode of operation and/or to enter a second coast mode before entering the normal mode of operation from the emergency mode of operation.

Thus, in the normal mode of operation, if the DC link voltage falls below a threshold indicative of the AC power supply being lost, the emergency mode is entered (often following an intervening coast mode). Similarly, in the emergency mode, if the DC link voltage rises above a threshold indicative of the AC power supply being restored, the normal mode is entered (often following an intervening coast mode). In the coast mode(s), the motor is not driven and so power is not drained from the DC link capacitor 28.

In some forms of the invention, the first coast mode is entered for a first period of time (such as 10 ms). Thus, the emergency mode may be entered after a coast period of, for example, 10 ms. Other time periods for the first coast mode are possible, such as 1 ms, 1 second or 10 seconds. The coast period that is appropriate might be dependent on the power level of the motor being used; for example, higher power motors might require longer coast periods. In some embodiments (e.g. when low power motors are being used), the period of the first coast mode may be reduced to zero. The first coast mode may be a user configurable parameter.

Alternatively, or in addition, the first coast mode may be exited when the DC link voltage falls below a third threshold voltage. Thus, in some forms of the invention, the first coast period is a minimum of the first period of time, but may be longer if the DC link voltage has not fallen below the third threshold voltage after that period of time. Alternatively, there may be no minimum first coast period, such that the first coast mode lasts only until the DC link voltage falls below the third threshold voltage.

In some forms of the invention, the second coast mode is entered for a second period of time (such as 10 ms). Thus, the normal mode may be entered after a coast period of, for example, 10 ms. Other time periods for the second coast mode are possible, such as 1 ms, 1 second or 10 seconds. The coast period that is appropriate might be dependent on the power level of the motor being used; for example, higher power motors might require longer coast periods. In some embodiments (e.g. when low power motors are being used), the period of the second coast mode may be reduced to zero. The second coast mode may be a user configurable parameter.

Alternatively, or in addition, the second coast mode may be exited when the DC link voltage rises above a fourth threshold voltage. Thus, in some forms of the invention, the second coast period is a minimum of the second period of time, but may be longer if the DC link voltage has not risen above the fourth threshold voltage after that period of time. Alternatively, there may be no minimum second coast period, such that the second coast mode lasts only until the DC link voltage rises above the fourth threshold voltage.

The emergency mode may include limiting the output power and/or the motor speed and/or motor current. This may be achieved, for example, by limiting one or more of motor speed, motor torque and output current in the emergency mode (for example, under the control of a control module). By way of example, the output current may be limited to 55% of the normal output current and/or the motor speed may be limited to 45 Hz. Further, the amount by which said one or more of motor speed, motor torque and output current is/are limited in the emergency mode may be variable (for example, under the control of a control module).

BRIEF DESCRIPTION OF THE DRAWINGS

The invention will now be described in further detail with reference to the following schematic drawings, in which.

DETAILED DESCRIPTION

Figure 2:
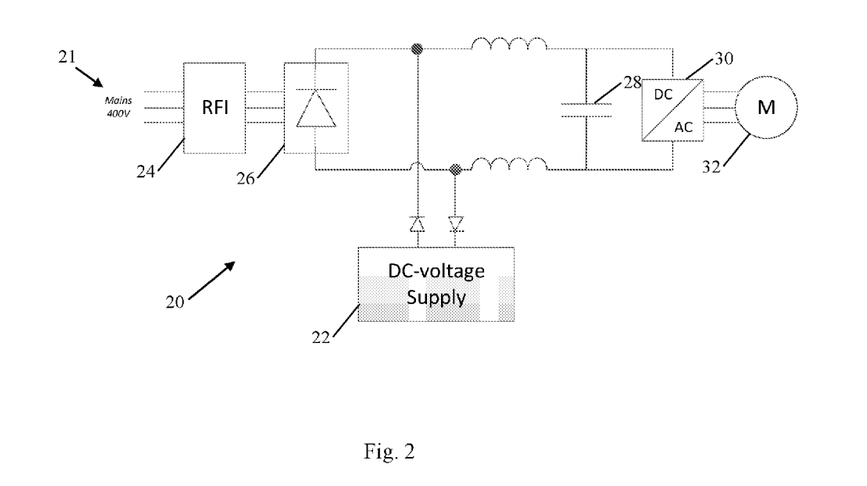
FIG. 2 shows an inverter drive system in accordance with an embodiment of the present invention.

FIG. 2 shows an inverter drive system, indicated generally by the reference numeral 20, in accordance with an embodiment of the present invention. The system 20 comprises an AC mains supply 21, a DC voltage supply 22, a filter 24, a rectifier 26, a DC link capacitor 28, an inverter 30 and a motor 32. The AC mains supply 21 may, for example, provide a voltage of 400V (as suggested in FIG. 2), but the principles of the present invention apply regardless of the absolute values being used.

In the normal use of the system, the DC link capacitor is charged by the AC mains supply 21 that is rectified by the rectifier 26. In the event that the AC mains supply 21 fails, the DC link capacitor 28 is charged by the DC voltage supply 22.

As described in detail below, a controller (not shown in FIG. 2) is used to control the inverter 30 appropriately, depending on whether the DC link capacitor 28 is being charged by the AC mains supply 21 or the DC voltage supply 22. When the AC mains supply 21 is available, the inverter (and hence the motor 32) is operated in a normal mode. When the AC mains supply 21 is not available (such that the DC voltage supply is used), the inverter (and motor) are operated in an emergency mode. In the emergency mode, the motor frequency (and hence the motor speed) is limited. For example, the motor speed may be limited to 45 Hz. The output power is also limited (for example by limiting the output current to 55% of the normal output current). Of course, 45 Hz and 55% of normal output current are provided by way of example only. These values may also be variable; for example, the values may be calculated by a controller depending on the available DC power.

Figure 3:
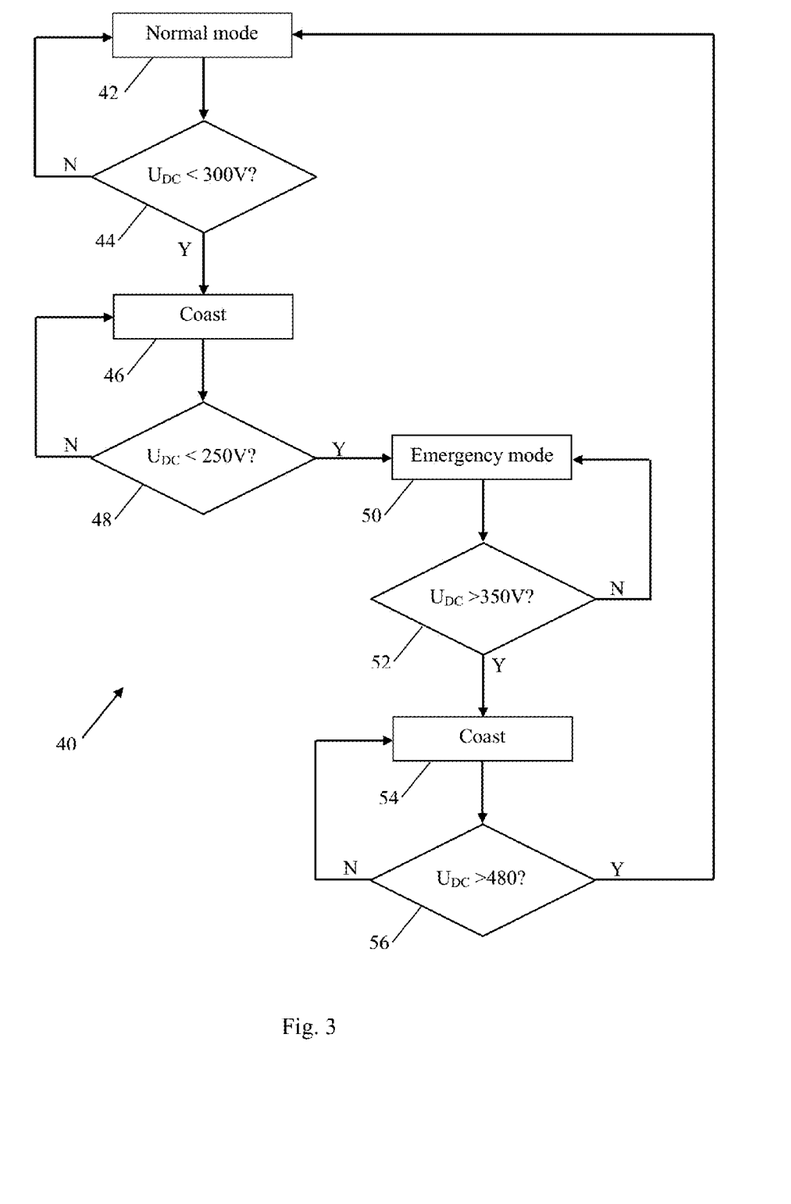
FIG. 3 is a flow chart showing an algorithm in accordance with an aspect of the present invention.

FIG. 3 is a flow chart showing an algorithm, indicated generally by the reference numeral 40, in accordance with an aspect of the present invention.

The algorithm 40 starts at step 42, where the system 20 is in the normal mode of operation. At step 44, it is determined whether the DC link voltage (i.e. the voltage across the capacitor 28) has fallen below a voltage threshold (300V is suggested by way of example). If not, the algorithm 40 returns to step 42 such that the system remains in the normal mode.

If, in step 42, it is determined that the DC link voltage has dropped below the voltage threshold, this indicates that the AC power supply 21 has been lost, and the algorithm 40 moves to step 46, where the motor is allowed to coast (step 46) for a short period of time (10 ms in one embodiment of the invention, but other durations could be used).

After the coasting period, the algorithm moves to step 48 where it is determined whether the DC link voltage has dropped below another voltage threshold (250V is suggested by way of example in FIG. 3). If so, the algorithm 40 moves to step 50: if not, the algorithm returns to step 46 such that the motor coasts until the DC link voltage drops below the relevant voltage threshold.

At step 50, the system 20 enters the emergency mode. In the emergency mode, the DC link capacitor 28 is charged by the DC supply 22. As described in detail below, the DC link voltage is lower in the emergency mode than in the normal mode and this has implications for the motor speed and torque that are available.

At step 52, it is determined whether the DC link voltage has risen above a voltage threshold (350V is suggested by way of example in FIG. 3). If not, the algorithm returns to step 50 (such that the system 20 remains in the emergency mode). If so, this indicates that the AC power supply is operational and is charging the DC link voltage. In response, the algorithm 40 moves to step 54 where the motor is allowed to coast for a short period (such as 10 ms) before it is determined (at step 56) whether the DC link voltage has risen above another voltage threshold (480V is suggested by way of example in FIG. 3). If not, the algorithm 40 returns to the coasting step 54. If so, the algorithm returns to step 42 where the normal mode is entered once again.

Thus, the determination of whether the system 20 should operate in the normal mode or the emergency mode depends on the DC link voltage. The DC link voltage is readily detected by a standard motor drive controller (such as the controller 10 shown in the prior art system 1 described above).

Although the algorithm 40 suggests that the modes are changed whenever the DC link voltage rises above or falls below the relevant voltage threshold, the algorithm may be adapted to ensure that short-duration voltage sags and dips are disregarded, thereby preventing the mode from changing as a result of normal fluctuations in the relevant power supplies.

As described above, when transitioning between normal and emergency modes of operation, a coast period is inserted. In the coast period, the motor is not driven and so power is not drained from the DC link capacitor 28. When entering the emergency mode of operation, a coasting period allows the DC link voltage to drop from the level generated when the AC power supply 21 is available to a level generated from the DC power supply 22. Without this coast period, current spikes are likely to occur during the transition to the emergency mode. On exiting the emergency mode without using a coast period, over-voltage conditions can occur, since in-rush protection may not be activated. Over-current conditions can also occur. By reducing the occurrence of over-current and over-voltage conditions, the provision of coast periods can improve the lifetime of the relevant drive components.

Figure 4:
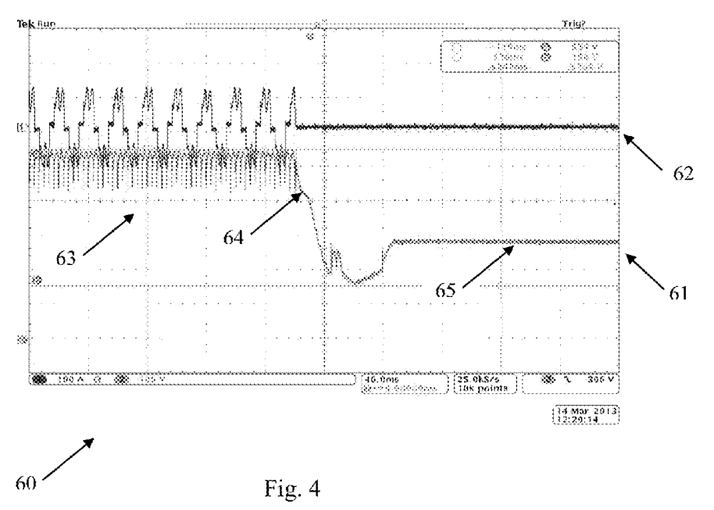
FIG. 4 shows the DC link voltage and the input current to the drive in an exemplary use of a circuit in accordance with an aspect of the present invention.

FIG. 4 shows the DC link voltage 61 and the input current 62 to the drive in the system 20 during a period when the system 20 is entering the emergency mode of operation.

Initially (at the time generally indicated by the reference numeral 63), the system 20 is operating in the normal mode (and so the algorithm is at step 42). In the normal mode, the AC power supply 21 is charging the DC link capacitor 28.

At time 64, the AC power supply 21 is lost. The motor 32 continues to be operated in the normal mode such that the inverter 30 draws power from the DC link capacitor 28. As a result, the DC link voltage drops. When the DC link voltage drops below the relevant threshold (e.g. 300V in the algorithm 40 described above), the system 20 enters a coast mode (step 46) such that the motor 32 is no longer being drive by the inverter 30. At this stage, the DC link voltage is no longer drained by the inverter 30 and the speed of the motor 32 drops.

After the coasting delay (of perhaps 10 ms), the emergency mode is entered. The DC link voltage is now charged by the DC voltage supply 22 and the DC link voltage rises to a new operating level (indicated generally by the reference numeral 65), which, as shown in FIG. 4, is lower than the normal mode DC link voltage.

Figure 5:
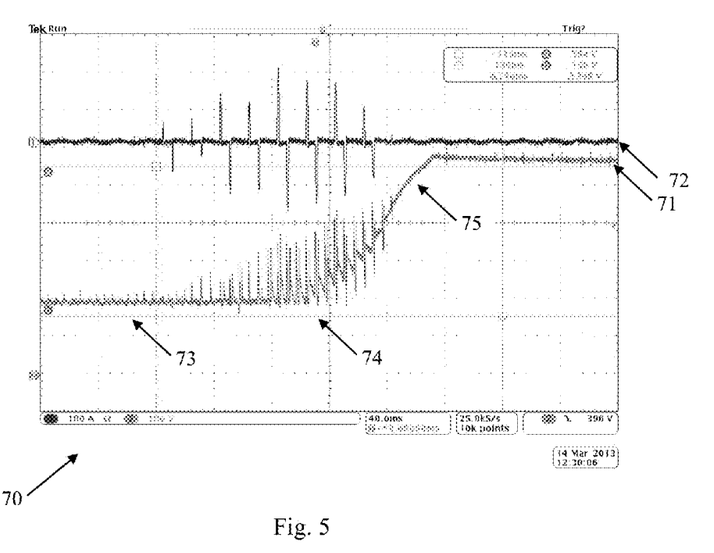
FIG. 5 shows the DC link voltage and the input current to the drive in another exemplary use of a circuit in accordance with an aspect of the present invention.

FIG. 5 shows DC link voltage 71 and the input current 72 to the drive in the system 20 during a period when the system 20 is exiting the emergency mode of operation.

Initially (at the time generally indicated by the reference numeral 73), the system 20 is operating in the emergency mode (and so the algorithm is at step 50). In the emergency mode, the DC power supply 22 is charging the DC link capacitor 28.

During a period indicated generally by the reference numeral 74, the AC power supply 21 is reactivated. This results in the DC link voltage starting to rise (and also results in spikes being seen in the DC link voltage and current).

When the DC link voltage rises above the relevant threshold (e.g. 350V in the algorithm 40 described above), the coasting step 54 is activated. During the coasting step, the DC link capacitor 28 is charged but the motor 32 is not being driven. As indicated generally by the reference numeral 75, this results in the DC link voltage 75 rising to the required voltage during the normal mode. When the coasting period is complete, the motor is activated once more and the system operates in the normal mode.

In the algorithm 20 described above, on exiting the normal mode, the motor 32 coasts during step 46 and then the DC link voltage is measured in step 48. It is not necessary to have both of these steps in all embodiments of the invention. For example, once the coasting step 46 has been carried out, the algorithm may move directly to the emergency mode (step 50), thereby omitting step 48. In an alternative embodiment, the coasting mode may simply operate until the DC link voltage drops below the relevant threshold (e.g. 250V) (so that there is no minimum coasting period as defined by the step 46 above).

Similarly, on exiting the emergency mode, it is not necessary in all embodiments of the invention for the motor 32 to coast during step 54 and then for the DC link voltage to be measured in step 56. For example, once the coasting step 54 has been carried out, the algorithm may move directly to the normal mode (step 42), thereby omitting step 56. In an alternative embodiment, the coasting mode may simply operate until the DC link voltage rises above the relevant threshold (e.g. 480V) (so that there is no minimum coasting period as defined by the step 54 above).

A number of other variants to the algorithm 40 described above could be provided. For example, some or all of the decision points 44, 48, 52 and 56 could be implemented using interrupts in a manner well known in the art. Furthermore, at least one of the coasting steps 48 and 54 could be omitted; this might be appropriate, for example, when the algorithm 40 is being used with low power motors.

Figure 6:
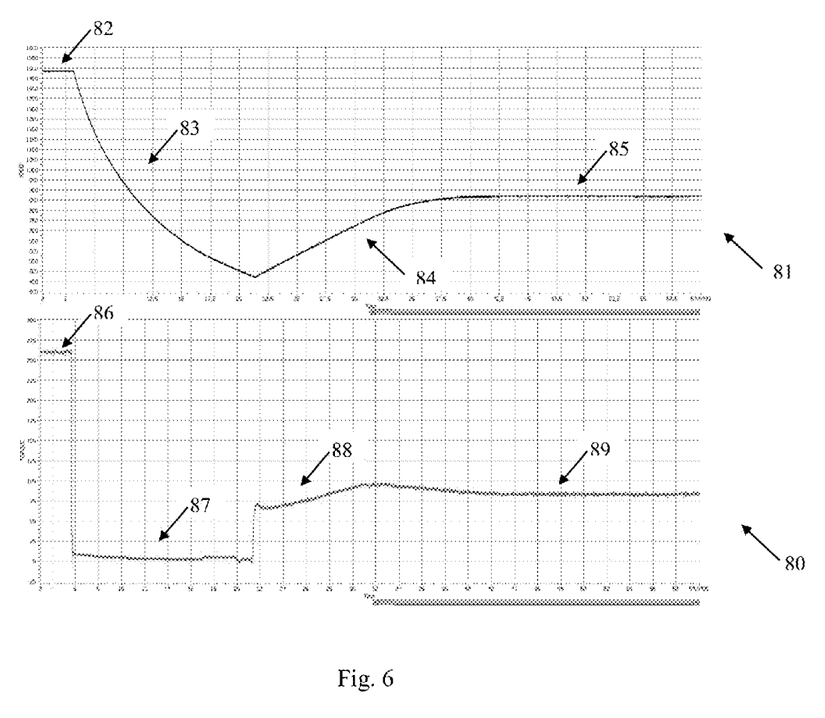
FIG. 6 shows speed and torque curves on entry into an emergency mode in an embodiment of the present invention.

FIG. 6 shows torque and speed curves (indicated generally by the reference numerals 80 and 81 respectively) on entry into an emergency mode in an embodiment of the present invention.

Initially, the system is in the normal mode (step 42 of the algorithm 40). In the normal mode, both the motor speed 82 and the motor torque 86 are high. If a drop in the DC link voltage is detected, the motor enters the coasting state 46. In the coasting state, the motor 32 is not being driven, so the torque drops to zero (as indicated by the reference numeral 87). Due to inertia, the motor continues to spin, but the speed drops (as indicated by the reference numeral 83).

Once the emergency mode is entered, the motor 32 is once again driven. At this stage, the motor speed rises (as indicated by the reference numeral 84) and a motor torque is applied (as indicated by the reference numeral 88). The motor speed continues to rise until it reaches the normal operation speed of the motor 32 in the emergency mode (as indicated by the reference numeral 85).

As is clearly shown in FIG. 6, the motor speed 85 in the emergency mode is lower than the motor speed 82 in the normal mode. This is achieved by limiting the output power of the inverter 30 (for example by limiting the output current or the motor speed) and is provided in order to reduce the load on the DC power supply 22 (which is typically a battery). The torque available from the motor 32 is linked to the motor speed and so the torque 89 in the emergency mode is also lower than the torque 86 in the normal mode.

Figure 7:
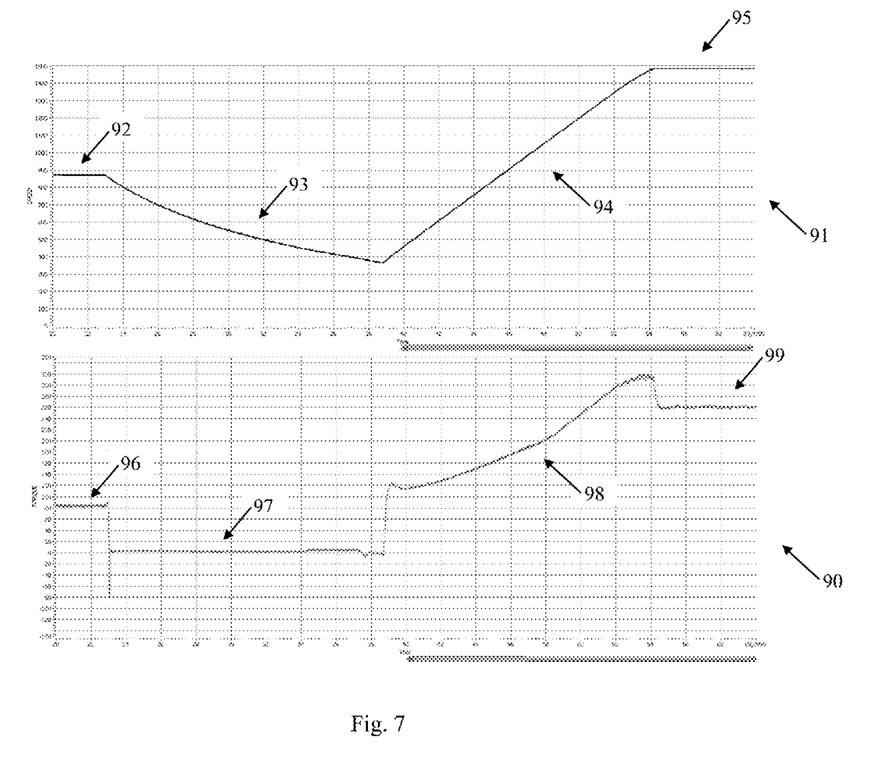
FIG. 7 shows speed and torque curves on exiting an emergency mode in an embodiment of the present invention.

FIG. 7 shows torque and speed curves (indicated generally by the reference numerals 90 and 91 respectively) on exiting an emergency mode in an embodiment of the present invention.

Initially, the system is in the emergency mode (step 50 of the algorithm 40). As explained above, in the emergency mode, both the motor speed 92 and the motor torque 96 are relatively low. If a rise in the DC link voltage is detected, the motor enters the coasting state 52. In the coasting state, the motor 32 is not being driven, so the torque drops to zero (as indicated by the reference numeral 97). Due to inertia, the motor continues to spin, but the speed drops (as indicated by the reference numeral 93).

Once the normal mode is entered, the motor 32 is once again driven. At this stage, the motor speed rises (as indicated by the reference numeral 94) and a motor torque is applied (as indicated by the reference numeral 98). The motor speed continues to rise until it reaches the normal operation speed of the motor in the normal mode (as indicated by the reference numeral 95).

As is clearly shown in FIG. 7, the motor speed 92 in the emergency mode is lower than the motor speed 95 in the normal mode and the torque 96 in the emergency mode is lower than the torque 99 in the normal mode.

The embodiments of the invention described above are provided by way of example only. The skilled person will be aware of many modifications, changes and substitutions that could be made without departing from the scope of the present invention. For example, the particular voltages and times mentioned in the algorithm 40 described above are provided by way of example only. The claims of the present invention are intended to cover all such modifications, changes and substitutions as fall within the spirit and scope of the invention.

What is claimed is:

1. A method of controlling a motor drive, the method comprising a normal operation mode wherein a DC link voltage is charged using an AC power supply and an emergency mode wherein the DC link voltage is charged using a DC supply, wherein output power is limited in the emergency mode, wherein:
   in the normal mode of operation, determining whether the DC link voltage falls below a first threshold and, if so, entering the emergency mode of operation; and
   in the emergency mode of operation, determining whether the DC link voltage rises above a second threshold and, if so, entering the normal mode of operation,
   the method further comprising:
   entering a first coast mode before entering the emergency mode of operation from the normal mode of operation and/or entering a second coast mode before entering the normal mode of operation from the emergency mode of operation.

2. The method as claimed in claim 1, wherein the first coast mode is entered for a first period of time.

3. The method as claimed in claim 1, wherein the second coast mode is entered for a second period of time.

4. The method as claimed in claim 1, wherein the first coast mode is exited when the DC link voltage falls below a third threshold voltage.

5. The method as claimed in claim 1, wherein the second coast mode is exited when the DC link voltage rises above a fourth threshold voltage.

6. The method as claimed in claim 1, wherein the amount by the output power is limited is variable.

7. The method as claimed in claim 1, wherein one or more of motor speed, motor torque and output current are limited in the emergency mode.

8. The method as claimed in claim 7, wherein the amount by which said one or more of motor speed, motor torque and output current is/are limited in the emergency mode is variable.

9. The method as claimed in claim 2, wherein the second coast mode is entered for a second period of time.

10. The method as claimed in claim 2, wherein the first coast mode is exited when the DC link voltage falls below a third threshold voltage.

11. The method as claimed in claim 3, wherein the first coast mode is exited when the DC link voltage falls below a third threshold voltage.

12. The method as claimed in claim 2, wherein the second coast mode is exited when the DC link voltage rises above a fourth threshold voltage.

13. The method as claimed in claim 3, wherein the second coast mode is exited when the DC link voltage rises above a fourth threshold voltage.

14. The method as claimed in claim 4, wherein the second coast mode is exited when the DC link voltage rises above a fourth threshold voltage.

15. A control module configured to determine a DC link voltage of a motor drive, wherein:
   in a normal mode of operation, the control module determines whether the DC link voltage falls below a first threshold and, if so, enters an emergency mode of operation, wherein in the emergency mode, the DC link voltage is charged using a DC supply; and
   in the emergency mode of operation, the control module determines whether the DC link voltage rises above a second threshold and, if so, enters the normal mode of operation, wherein in the normal mode the DC link voltage is charged using an AC power supply,
   wherein the control module is further configured to enter a first coast mode before entering the emergency mode of operation from the normal mode of operation and/or to enter a second coast mode before entering the normal mode of operation from the emergency mode of operation.

16. The control module as claimed in claim 15, further comprising limiting the output power in the emergency mode.

17. The control module as claimed in claim 16, wherein the control module is configured to vary the amount by which the output power is limited.

18. The control module as claimed in claim 15, further comprising limited one or more of motor speed, motor torque and output current in the emergency mode.

19. The control module as claimed in claim 18, wherein the control module is configured to vary the amount by which said one or more of motor speed, motor torque and output current is/are limited.

20. A method of controlling a motor drive, the method comprising a normal operation mode wherein a DC link voltage is charged using an AC power supply and an emergency mode wherein the DC link voltage is charged using a DC supply, wherein:
   in the normal mode of operation, determining whether the DC link voltage falls below a first threshold and, if so, entering the emergency mode of operation; and
   in the emergency mode of operation, determining whether the DC link voltage rises above a second threshold and, if so, entering the normal mode of operation,
   the method further comprising:
   entering a first coast mode before entering the emergency mode of operation from the normal mode of operation and/or entering a second coast mode before entering the normal mode of operation from the emergency mode of operation;
   wherein the first coast mode is exited when the DC link voltage falls below a third threshold voltage.

* * * * *